(12) United States Patent
Kamimura et al.

(10) Patent No.: US 6,438,248 B1
(45) Date of Patent: Aug. 20, 2002

(54) HAND-FREE APPARATUS

(75) Inventors: Tomohiko Kamimura, Habikino; Satoru Fujiwara, Izumi; Koji Nasu, Nara-ken; Shingo Sato, Yao, all of (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 09/630,232

(22) Filed: Aug. 1, 2000

(30) Foreign Application Priority Data

Aug. 5, 1999 (JP) ............................................ 11-222090

(51) Int. Cl.[7] .............................................. H04R 25/00
(52) U.S. Cl. ....................... 381/374; 381/380; 455/351; 455/569
(58) Field of Search ................................ 381/370, 375, 381/384; 455/515, 90, 569, 351; 439/501, 12–13, 18, 20, 22, 24, 27; 379/430, 438

(56) References Cited

U.S. PATENT DOCUMENTS

| | | | | |
|---|---|---|---|---|
| 4,868,862 A | * | 9/1989 | Royoichi et al. | ............. 379/58 |
| 4,946,010 A | * | 8/1990 | DiBono | |
| 5,128,993 A | * | 7/1992 | Skowronski | ................ 379/438 |
| 5,422,957 A | * | 6/1995 | Cummins | ................... 381/183 |
| 5,684,883 A | | 11/1997 | Chen | ........................ 381/187 |
| 5,832,098 A | | 11/1998 | Chen | ........................ 381/370 |

FOREIGN PATENT DOCUMENTS

| | | | |
|---|---|---|---|
| JP | 11055369 | 2/1999 | ............ H04M/1/02 |
| JP | 11055778 | 2/1999 | ............ H04R/1/10 |

* cited by examiner

*Primary Examiner*—Sinh Tran
(74) *Attorney, Agent, or Firm*—Townsend and Townsend and Crew, LLP (57) ABSTRACT

A hand-free apparatus having improved portability is disclosed. The apparatus includes an apparatus body including a transmitter and a receiver, an input/output cable connected with the transmitter and the receiver and extending outside from the apparatus body, a cable case incorporating a cable spool capable of taking up the cable and a retaining member capable of detachably retaining the apparatus body on the cable case. The apparatus body when retained by the retaining member extends along a peripheral face of the cable spool.

13 Claims, 5 Drawing Sheets

HAND-FREE APPARATUS

BACKGROUND OF THE INVENTION

1. Field of the Invention

The present invention relates to a hand-free apparatus or an earpiece apparatus with a microphone. More particularly, the invention relates to a hand-free apparatus comprising:

an apparatus body including a transmitter and a receiver, an input/output cable connected with the transmitter and the receiver and extending outside from the apparatus body;

a cable case incorporating a cable spool capable of taking up the cable; and a retaining means capable of detachably retaining the apparatus body on the cable case.

2. Description of the Related Art

A typical hand-free apparatus of the above-noted type is known from the Japanese registered utility model No. 3049844. With this conventional hand-free apparatus, by connecting the input/output cable of the apparatus to e.g. a portable telephone and then by unwinding an appropriate length of the cable from the cable spool incorporated within the cable case, the receiver, i.e. the earpiece, may be attached to the ear hole of a user, so that the user may effect telephone communication under a hand-free condition. Further, when the portable telephone is not in use, the unnecessary cable length may be all wound about and stored on the cable spool disposed inside the cable case, so that such problem of bulkiness or entanglement of cable may be avoided.

With the above-described conventional hand-free apparatus, its cable case is provided in the form of a thin disc-like component, which defines, in the front face thereof, a retainer hole for engaging and retaining the receiver of the apparatus body.

Accordingly, in the case of the conventional hand-free apparatus of the above-described construction, from the center of the flat face of the disc-like cable case, the receiver projects along the axis of the disc. In other words, when the apparatus body is retained to the cable case, the hand-free apparatus as a whole is bulky in the thickness direction of the cable case, so that the portability of the apparatus is not sufficient and the apparatus cannot be conveniently held within a pocket of the user's clothes in particular. Further, when the apparatus body is retained to the cable case, the receiver projects from the center of the flat face of the disc-shaped cable case along the axis of the disc and the transmitter extends radially outward from this receiver. Hence, when the apparatus is held within a pocket of the user's clothes, an external force may be applied inadvertently to the receiver of the apparatus, tending to disengage the apparatus body from the cable case by a leverage action.

SUMMARY OF THE INVENTION

A primary object of the present invention is to provide a hand-free apparatus which provides improved portability under the condition that its apparatus body is retained to the cable case and whose apparatus body can effectively resist inadvertent disengagement from the cable case when subjected to an external force when the apparatus is held within a pocket of a user's clothes with the apparatus body being retained to the cable case.

For fulfilling the above-noted object, a hand-free apparatus according to the present invention, comprises:

an apparatus body including a transmitter and a receiver, an input/output cable connected with the transmitter and the receiver and extending outside from the apparatus body;

a cable case incorporating a cable spool capable of taking up the cable; and a retaining means capable of detachably retaining the apparatus body on the cable case;

wherein the apparatus body when retained by the retaining means extends along a peripheral face of the cable spool.

With the apparatus having the above-described construction, when the apparatus body is attached to the cable case by the retaining means, this apparatus body extends along the peripheral face of the cable spool. Therefore, when the cable case is formed like a plate member, the receiver does not project from the flat front face of this cable case. As a result, the hand-free apparatus, when the apparatus body is retained to the cable case, does not become bulky in the direction of thickness of the cable case, so that sufficient portability may be obtained and the portability of the apparatus within a user's clothes pocket may be significantly improved. Further, when the hand-free apparatus is held within the clothes pocket with the apparatus body being retained to the cable case, this apparatus body will hardly be disengaged from the cable case when subjected to an external force.

Also, when the apparatus body is attached to the cable case by the retaining means, this apparatus body extends along the peripheral face of the cable spool. Therefore, the apparatus body may be formed sufficiently elongate within a limit not significantly exceeding the outer dimensions of the cable case so as to improve the handiness thereof, while maintaining the compactness of the entire hand-free apparatus when the apparatus body is retained to the cable case.

Preferably, the cable case includes urging means for urging the cable spool in a rotational direction for taking up the cable and take-up control means switchable between a locked condition for restricting rotation of the cable spool by the urging means and a free condition for allowing the rotation of the cable spool by the urging means.

With the above construction, by pulling the cable to rotate the cable spool against the urging force of the urging means, a necessary length of the cable may be withdrawn from the cable case. And, under this condition, by switching over the take-up control means to the locked condition, the cable will not be taken up on the cable spool unintentionally and the necessary length of the cable may be maintained under the withdrawn condition. Subsequently, by switching over the take-up control means to the free condition, the cable spool will automatically take up the withdrawn length of the cable under the urging force of the urging means. Hence, the user need not take up the cable manually.

In addition to the above, the apparatus body preferably includes an arm member having a longitudinal direction and the receiver extends from the arm member in a direction transverse to the longitudinal direction; and the retaining means includes a shoulder portion for supporting the receiver thereon.

With the above construction, it is possible to retain the receiver which is bent from the arm member by hooking the receiver on the shoulder portion of the retaining means, so that the hand-free apparatus body may be always maintained at a fixed position relative to the retaining means.

Still preferably, the cable extends from a predetermined position of the arm member and the cable case defines a through hole for allowing withdrawal of the cable from the cable spool; and a position of the through hole and the predetermined position of the arm member are arranged so as to allow the receiver to be pressed against the shoulder portion under the urging force for taking up the cable on the cable spool when the hand-free apparatus body is retained by the retaining means.

With the above construction, by switching over the take-up control means to the free condition, the receiver will be pressed against the shoulder portion under the urging force which force will remain effective after completion of the take-up of the entire exposed length of cable. Therefore, the apparatus body may be retained by the retaining means under a stable condition.

Still preferably, the retaining means includes a contacted portion formed on a lateral face of the cable case for coming into contact with the transmitter of the apparatus body retained by the retaining means; and a position of the through hole and the predetermined position of the arm member are arranged so as to allow the transmitter to be pressed against the contacted portion under the urging force for taking up the cable on the cable spool when the hand-free apparatus body is retained by the retaining means.

With the above construction, by switching over the take-up control means to the free condition, the receiver will be pressed against the shoulder portion under the urging force which force will remain effective after completion of the take-up of the entire exposed length of cable. Moreover, the transmitter too will be pressed against the contacted portion under the urging force. So that, the apparatus body is pressed, adjacent the longitudinal opposed ends thereof, against the lateral face of the cable case. Therefore, the apparatus body may be retained by the retaining means under a more stable condition.

Preferably, the retaining means includes a pair of guide plates extending from the cable case to be opposed to a portion of the apparatus body retained by the retaining means in a direction parallel to a rotational axis of the cable spool.

With the above construction, the apparatus body retained to the retaining means will be fitted between the pair of guide plates extending from the cable case. Thus, displacement of the apparatus body relative to the cable case in the thickness direction of this case may be mechanically restricted. As a result, this construction further improves the stability in the posture of the apparatus body as retained to the cable case.

Preferably, the apparatus further comprises an operating member for switching over the take-up control means, the operating member being disposed on an outer lateral face of the cable case opposite from the retaining means.

With the above-described construction, the retaining means and the operating member for operating the spool may be distributed to the right and left positions on the cable case. Therefore, when the user tries to retain the apparatus body by the retaining means while the withdrawn cable is being taken up on the cable spool, the user can operate the operating member with one hand and also can guide the apparatus body to the retaining means with the other hand. Moreover, in the course of this, there will hardly occur interference between the one hand operating the operating member and the other hand guiding the apparatus body.

Preferably, the retaining means includes magnetic attraction means disposed between the arm member and the cable case.

With the above construction, the means is provided for allowing reliable retention of the apparatus body on the cable case and also this apparatus body may be easily released from this retaining means, i.e. the magnetic attraction means, with a simple operation of detaching the body from the case against the magnetic attraction. Moreover, since the magnetic attraction means retains the apparatus body by means of magnetic attraction, mechanical wear or deformation will hardly occur in the apparatus body or in this retaining means. Therefore, this retaining means may provide the effective retaining performance reliably for a long period of time.

Alternatively, the apparatus body includes a longitudinally extending arm member which defines, in one of its opposed lateral faces, engaging recesses extending in the longitudinal direction; and the retaining means includes a pair of engaging elements extending from the cable case to be elastically engaged within the engaging recesses.

With the above construction, the retaining means can mechanically retain the apparatus body in even more reliable manner. Further, this construction can eliminate the magnetic attraction means described above.

Further and other features and advantages of the invention will become apparent upon reading the following detailed description with reference to the accompanying drawings.

DESCRIPTION OF THE PREFERRED EMBODIMENT

A hand-free apparatus according to the present invention will be described next with reference to the accompanying drawings.

(general construction of the hand-free apparatus)

Figure 1:
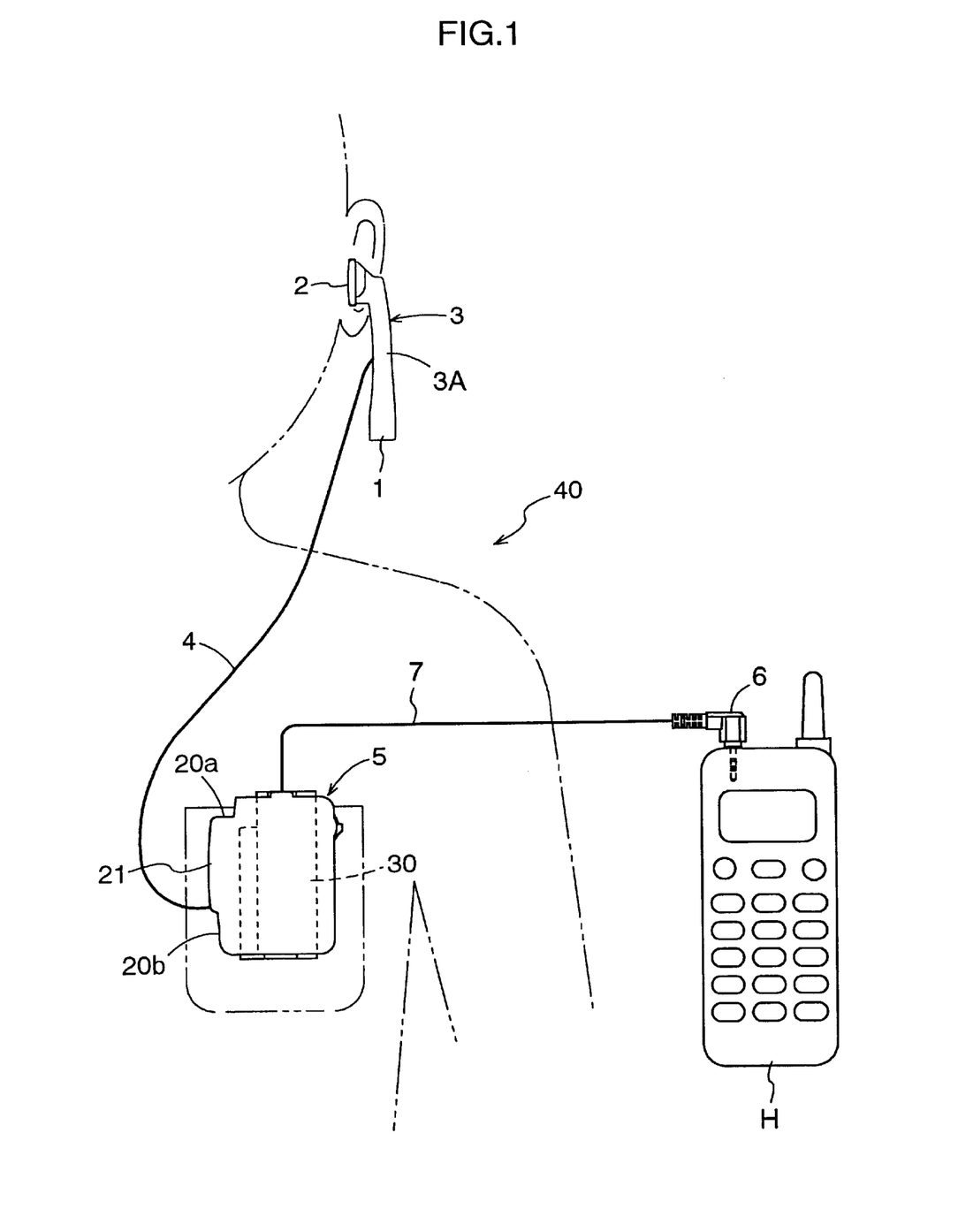
FIG. 1 is a schematic view showing a hand-free apparatus according to the present invention as used as an accessory for a portable telephone.

As shown in FIG. 1, a hand-free apparatus 40 according to the invention includes an apparatus body 3, a communication cable 4 (an example of input/output cable) extending from the apparatus body 3, and a cable case 5 capable of storing the cable 4 therein. From the cable case 5, there is extending a connector cable 7 for connecting the communication cable 4 to another electric appliance, such as a portable telephone H. A plug 6 is attached to a free end of the connector cable 7. Then, by connecting the connector cable 7 to the portable telephone H via the plug 6, this hand-free apparatus may be used as an accessory or attachment for allowing hand-free use of the portable telephone H.

(apparatus body)

The apparatus body 3 includes an arm member 3A having a longitudinal direction, and an earpiece 2 (an example of receiver) extending from an end of the arm member 3A in a direction transverse to its longitudinal direction, more particularly, with a angle of about 90 degrees relative thereto. And, a microphone 1 (an example of transmitter) is attached to the other end of the arm member 3A. Incidentally, the communication cable 4 extends from a through hole defined at a predetermined position 3*p* at approximate longitudinal center of the arm member 3A.

(cable case)

The cable case 5 is provided in the form of a relatively thin plate-like component having a substantially rectangular front face (and a rear face) and substantially rectangular lateral faces. More particularly, this cable case 5 includes a box case including a front-face case member 8A and a rear-face case member 8B screw-fixed the front-face case member 8B. The front-face case member 8A and the rear-face case member 8B both are made of synthetic resin material.

Figure 7:
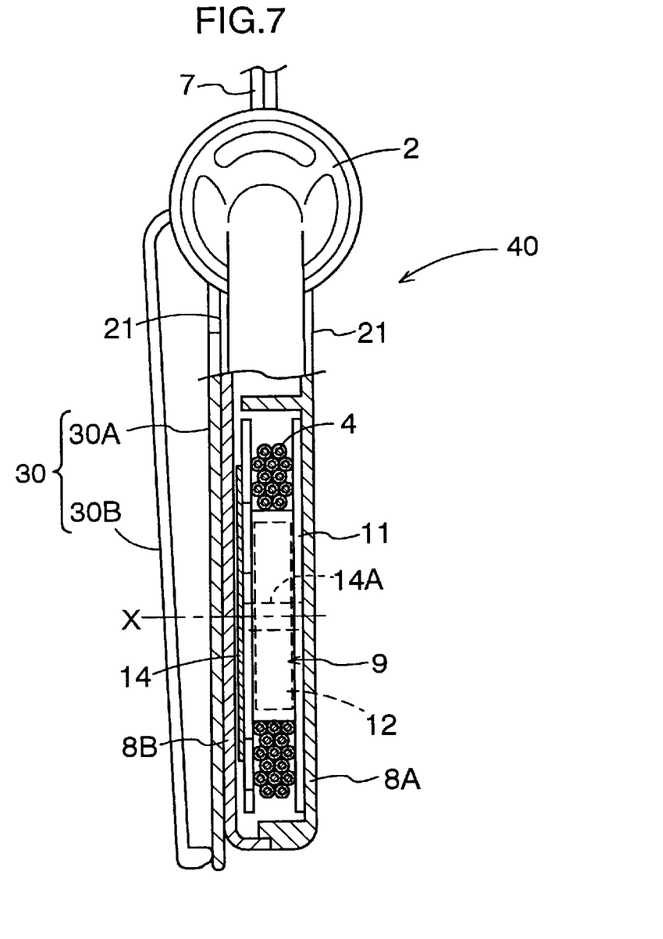
FIG. 7 is a side view in vertical section showing a cable case when retaining the hand-free apparatus body.

Further, the cable case 5 includes a cable take-up mechanism 9 for taking up an excessive length of the communication cable 4 for its storage inside the cable case 5, depending on the necessity. This cable take-up mechanism 9 includes a cable spool 11 rotatably mounted within the cable case for taking up the communication cable 4. As shown in FIG. 7, the cable spool 11 is formed like a disc-like member for allowing its storage within the thin plate-like cable case 5. And, this cable spool 11 is attached via a stay plate 14 to the front-face case member 8A of the cable case 8. From the stay plate 14, a shaft member 14A extends toward an inner face of the rear-face case member 8B. This shaft member 14A rotatably supports the cable spool 11. The stay plate 14 is fixed in position relative to the front-face case member 8A by means of a plurality of holes for receiving a plurality of pin portions 8*a* formed integrally with the front-face case member 8A and the stay plate 14 is pressed against the front-face case member 8A by the rear-face case member 8B. Further, the right-hand lateral face as seen from the rear face of the cable case 5 defines a through hole 8D for guiding the communication cable 4 unwound from the cable spool 11 to the outside of the cable case 5.

(take-up control means)

The cable take-up mechanism 9 further includes a helical spring 12 (an example of urging means) for urging the cable spool 11 in a rotational direction M for taking up the communication cable 4 and a take-up control means 13 which can be switched over between a locked condition in which the rotation of the cable spool 11 by the helical spring 12 in the rotational direction M is restricted and a free condition in which the rotation of the cable spool 11 by the helical spring 12 in the rotational direction M is permitted.

More particularly, the take-up control means 13 includes a saw-toothed engaging portion 15 formed in an outer peripheral face of the pair of lateral plates constituting the cable spool 11 and a ratchet member 16 pivotally mounted about an axis fixed on the front-face case member 8A. The ratchet member 16 includes a pawl 16A for coming into engagement with the saw-toothed engaging portion 15 of the cable spool 11 so as to restrict the rotation of the cable spool 11 in the rotational direction M (i.e. realize the locked condition). And, this ratchet member 16 is constantly urged by an end 17*a* of a helical spring 17 supported inside the cable case 5 toward a pivotal posture in which the pawl 16A is pressed against the outer peripheral face of the one lateral plate. Incidentally, total four such saw-toothed engaging portions 15 are formed with an appropriate spacing therebetween along the peripheral direction of the outer peripheral face of the one lateral face.

The take-up control means 13 further includes an operating means for switching over the take-up control means 13 to the free condition. This operating means consists essentially of the ratchet member 16 and an operating member 18 for operating or controlling the pivotal posture of the ratchet member 16 from the outside of the cable case 5. For this purpose, the ratchet member 16 includes an operated element 16B extending in a direction different from that of the pawl 16A. Further, the operating member 18 is pivotally supported about a horizontal axis fixed inside the cable case 5. From an end of this operating member 18, there is extending an operating arm 18*a* capable of advancing into a pivotal path of the operated element 16B of the ratchet member 16; and a knob 18*b* formed on the other end of the operating member 18 is always exposed outside of the cable case 5. Further, the operating member 18 is constantly urged by the other end 17*b* of the helical spring 17 in a direction of the operating arm 18*a* moving away from the operated element 16B of the ratchet member 16.

Figures 5, 6:
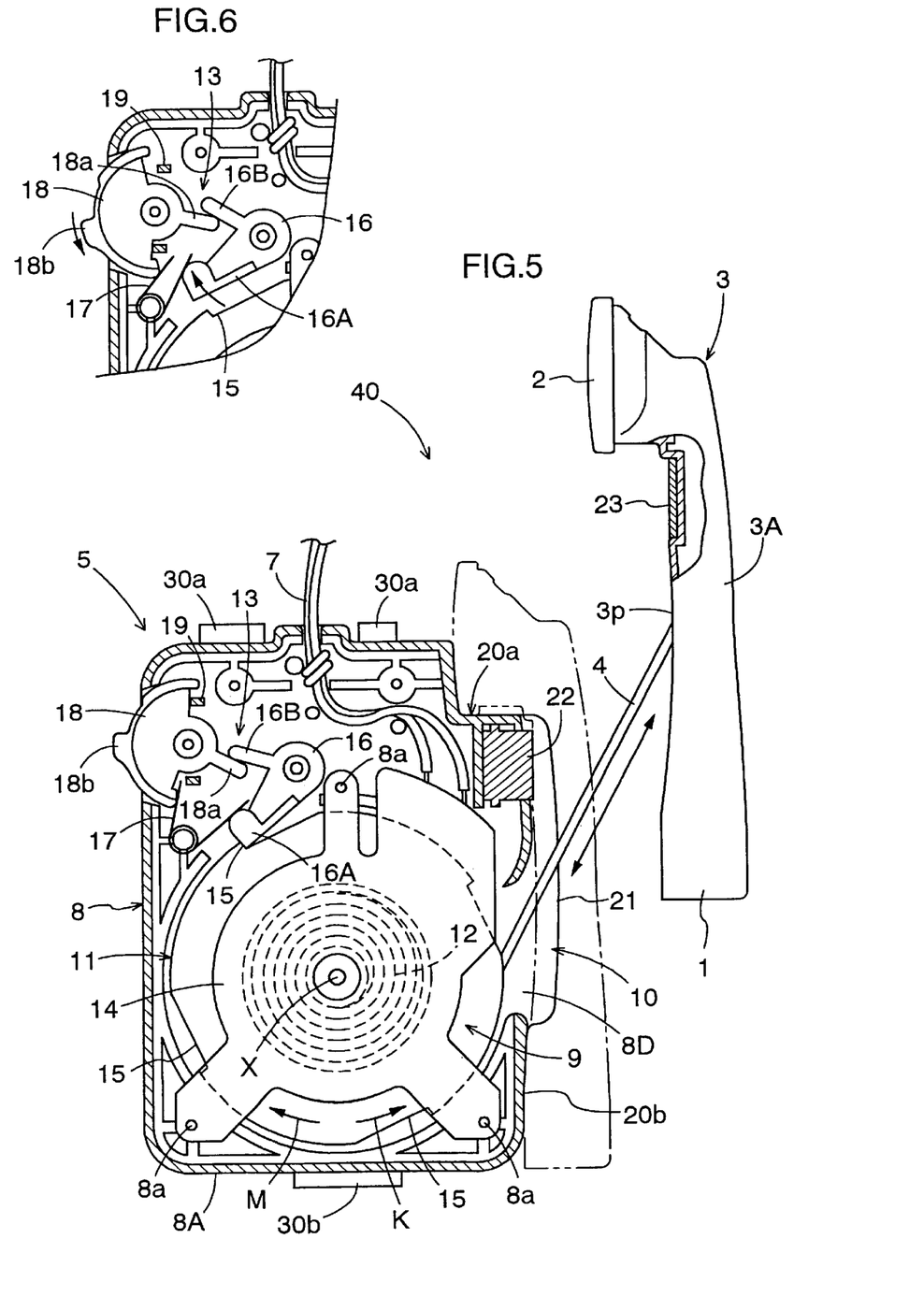
FIG. 5 is a rear view in vertical section of the cable case.
FIG. 6 is a rear view in vertical section showing principal portions of the cable case of FIG. 5 under a different condition.

In operation, when the user depresses the knob 18*b* in the direction of downward arrow in FIG. 6 (counter-clockwise rotation) against the urging force from the other end 17*b* of the helical spring 17, the operating arm 18*a* rotates the ratchet member 16 clockwise via the operated element 16B against the urging force from the one end of the spring 17. With this, there is realized the free condition in which the pawl 16A is disengaged from the saw-toothed engaging portion 15. On the other hand, when the user stops depressing the knob 18*b*, the operating member 18 is returned to its home position where the knob 18*a* projects in the horizontal direction (the condition shown in FIG. 5), so that the force applied by the operating arm 18*a* to the operated element 16B is immediately lost and there is realized the locked condition in which the pawl 16A of the ratchet member 16 is engaged with the nearest saw-toothed engaging portion 15 under the urging force from the one end 17*a* of the helical spring 17. For the purpose of setting the above-described home position of the operating member 18 at a fixed position, a stopper portion 19 is integrally formed with the front-face case member 8A for restricting the pivotal movement of the sector (fan-shaped) portion to a predetermined fixed position.

That is to say, only while the user keeps depressing the knob 18*b*, the free condition is realized temporarily and during this period alone the cable spool 11 keeps rotating in the take-up direction M for taking up the communication cable 4. As soon as the user stops depressing the knob 18*b*, in association with a small amount of subsequently continued rotation of the cable spool 11 in the take-up direction M, the pawl 16A comes into engagement with the nearest saw-toothed engaging portion 15, upon which engagement the rotation of the cable spool 11 in the take-up direction M is stopped and the taking up operation of the communication cable 4 too is stopped immediately.

As may be understood from the above, the single helical spring 17 co-acts as the one urging means (provided by the one end 17*a* of this spring 17) for urging to the engaged position (the position realizing the locked condition) in which the ratchet member 16 engages with the saw-toothed engaging portion 15 and the further urging means (provided by the other end 17*b* of the spring 17) for urging the operating member 18 to its home position (another position realizing the locked condition). Furthermore, while the user keeps his/her hand off the knob 18*b*, under the urging force of the spring 17 urging the sector against the stopper portion 19, the operating member 18 is retained at its home position in which the knob 18*b* projects in the horizontal direction so as not to prevent the ratchet member 16 being stopped at the engaged position. Accordingly, the operating member 18 may be constantly maintained at its home position and will not be pivoted inadvertently, not only when the communication cable 4 is stopped after its withdrawal, but also while the communication cable 4 is being withdrawing with the pivotal movement of the ratchet member 16.

(retaining means for the apparatus body)

The hand-free apparatus 40 further includes a retaining means capable of detachably retaining the hand-free apparatus body 3, when not used, on the cable case 5. This retaining means includes a retaining portion 10 formed on the right-hand lateral face of the cable case 8 as seen from the rear side thereof. The retaining portion 10 retains the apparatus body 3 under a raised posture where the earpiece 2 is located above and the microphone 1 is located below.

More particularly, this retaining portion 10 includes a shoulder portion 20a provided an a right-upper portion thereof as seen from the rear face of the cable case 8 so as form a step-wise recessed corner, a contacted portion 20b provided at a right-lower portion as seen from the rear face of the cable case 8, and a pair of fin-like guide plates 21, 21 vertically extending between the shoulder portion 20a and the contacted portion 20b.

Figure 3:
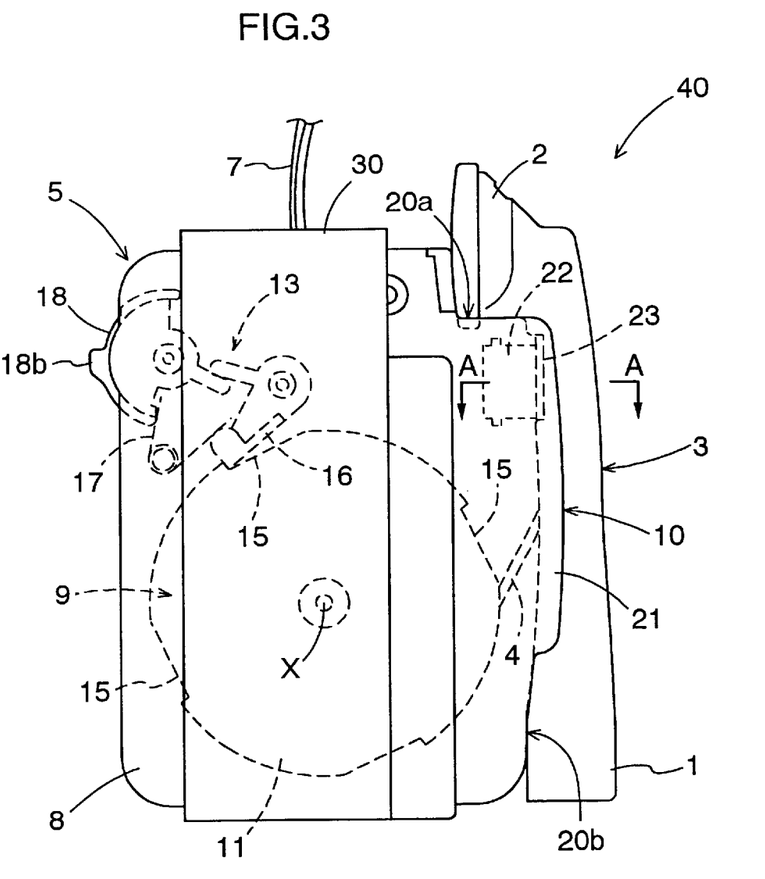
FIG. 3 is a rear view of a cable case when retaining an apparatus body of the hand-free apparatus.

The shoulder portion 20a is configured to be capable of supporting the earpiece 2 of the apparatus body 3 assuming the above-described raised posture. That is, as shown in FIG. 3, the apparatus body 3 retained to the retaining portion 10 is "hooked" via its earpiece 2 to the shoulder portion 20a. Further, the position of the through hole 8D of the cable case 8 and the position of the attaching position 3p of the arm member 3A for attachment of the communication cable 4 are arranged such that when the apparatus body b is retained to the retaining portion 10, the earpiece 2 may be pressed against the shoulder portion 20a under the urging force of the helical spring 12 for taking up the communication cable 4 on the cable spool 11.

Next, the contacted portion 20b is configured to fit the contour of the microphone 1 for facilitating the contacting-support of this microphone 1 of the apparatus body 3 as hooked on the shoulder 20a via the earpiece 2. Further, the position of the through hole 8D of the cable case 8 and the position of the attaching position 3p of the arm member 3A for attachment of the communication cable 4 are arranged such that when the apparatus body b is retained to the retaining portion 10, the microphone 1 may be pressed against the contacted portion 20b under the urging force of the helical spring 12 for taking up the communication cable 4 on the cable spool 11.

Specifically, in this embodiment, when the apparatus body 3 is retained to the retaining portion 10, the attaching position 3p for the communication cable 4 on the arm member 3A is located upwardly of a rotational axis (X) of the cable spool 11 and the rotational direction M of the cable spool 11 for taking up the cable is set as the clockwise direction. Therefore, the cable spool 11 will pull the communication cable 4 withdrawn from the apparatus body 3 in an obliquely downward to the left-lower side, that is, in such a manner as to depress the earpiece 2 against the shoulder portion 20a and depress the microphone 1 against the contacted portion 20b at the same time.

Lastly, the pair of guide plates 21, 21 are provided as fin-like elements projecting in opposition to each other. These guide plates 21, 21 are opposed to the inner portion (portion including the attaching position 3p for the communication cable 4) of the arm member 3a of the apparatus body 3 hooked on the shoulder 20a via the earpiece 2 in a direction parallel to the rotational axis (X: aligned with the center of the shaft element 14A) of the cable spool 11. Namely, as the portion of the apparatus body 3 is fitted between the pair of guide plates 21, 21, displacement of the apparatus body 3 relative to the cable case 5 in the thickness direction thereof may be mechanically restricted. Incidentally, one guide plate 21 is formed integrally with the front-face case member 8A during the molding thereof and the other guide member 21 is integrally formed with the rear-face case member 8B during the molding thereof, respectively.

Figure 4:
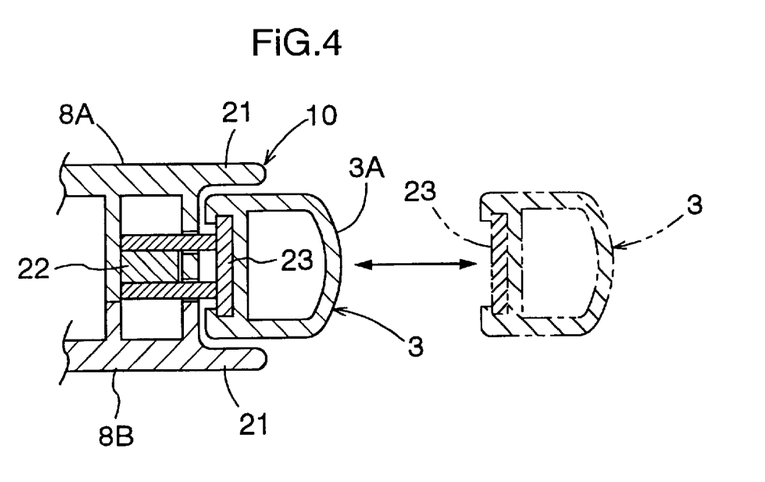
FIG. 4 is a plan view in horizontal section showing a magnetic attraction means.

The retaining means further includes a magnetic attraction means disposed between the arm member 3A of the apparatus body 3 and the cable case 5. This magnetic attraction means, as shown in FIG. 4, consists essentially of a permanent magnet 22 included within a portion of the shoulder 20a of the retaining portion 10 and an iron piece 23 fixed to an inner portion immediately below the earpiece 2. The iron piece 23 is disposed as a position to be attracted to the permanent magnet 22 when the apparatus body 3 is retained to the retaining portion 10. Alternatively, it is also possible to provide the permanent magnet 22 to the apparatus body 3 and the iron piece 23 to the cable case 5.

(clip)

Figure 2:
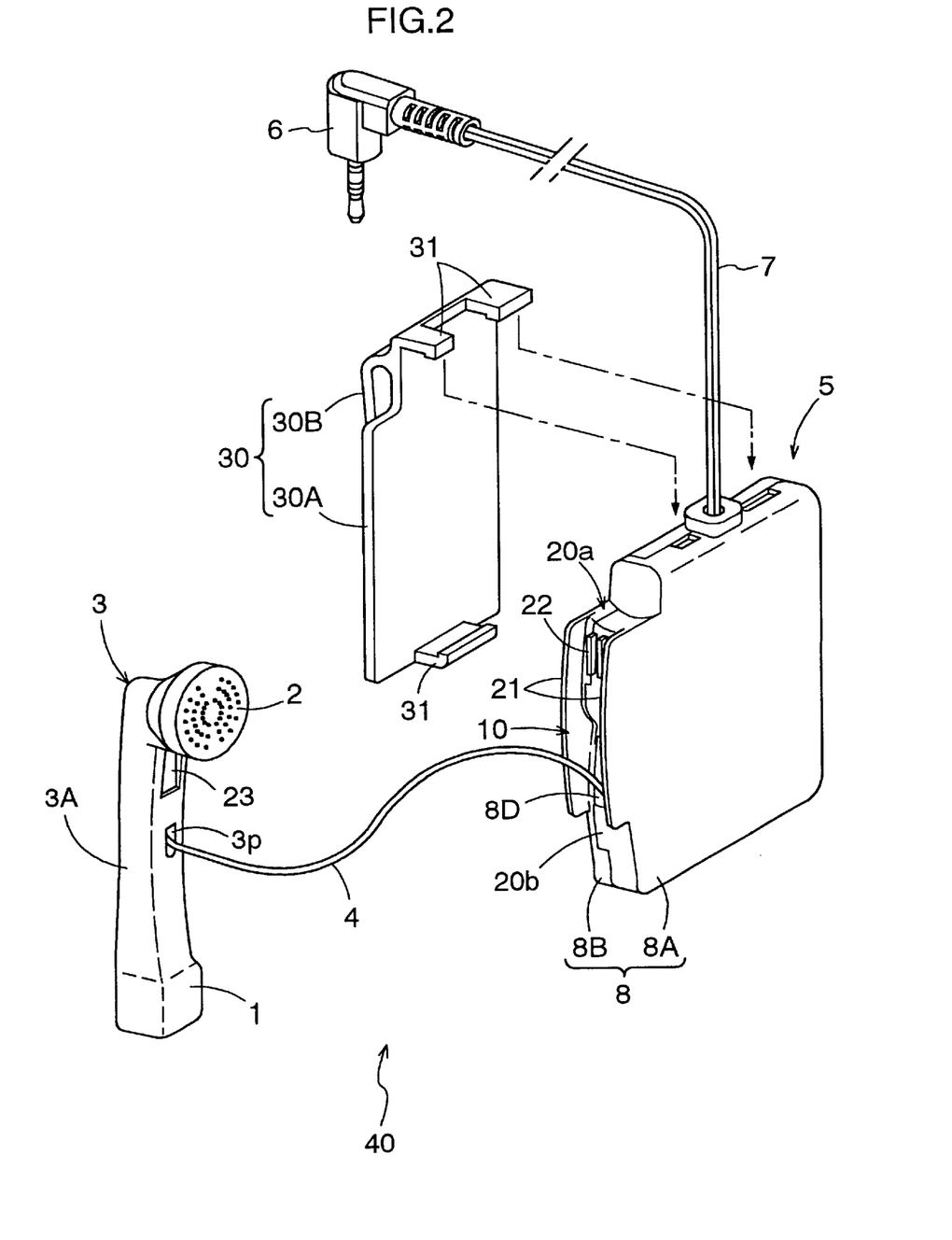
FIG. 2 is a perspective view of the hand-free apparatus.

The cable case 5 includes a clip 30 for attaching this case 5 to an edge of a user's clothe pocket, a belt or the like. As shown in FIG. 2, this clip 30 includes a clip body 30A attached to the cable case 5 and a clip piece 30B which first extends horizontally from a portion near an upper end of one face of the clip body 30A and then extends downwardly for a certain length. At upper and lower ends of the other face of the clip body 30A, there are formed attaching pieces 31a, 31b in the form of pawls, which vertically oppose to each other for elastically binding the cable case 5 therebetween. In correspondence therewith, the upper and lower end faces of the cable case 5, there are defined recesses or holes for receiving the attaching pieces 31a, 31b, respectively. The clip piece 30B, particularly its free end, is elastically deformable to move to and away from the clip body 30A, so that the clip piece 30B can elastically hold e.g. the fabric of the pocket in cooperation with the clip body 30A.

Incidentally, during the manufacture of the hand-free apparatus 40, the recesses or holes are formed by assembling the front-face case member 8A and the rear-face member 8B by means of screw-fastening. Thereafter, only by pressing the attaching pieces 31a, 31b of the clip body 30A into these recesses or holes with utilizing the elastic deformation of the clip body 30A, the clip 30 may be attached to the cable case 5.

[other embodiments]

Figure 8:
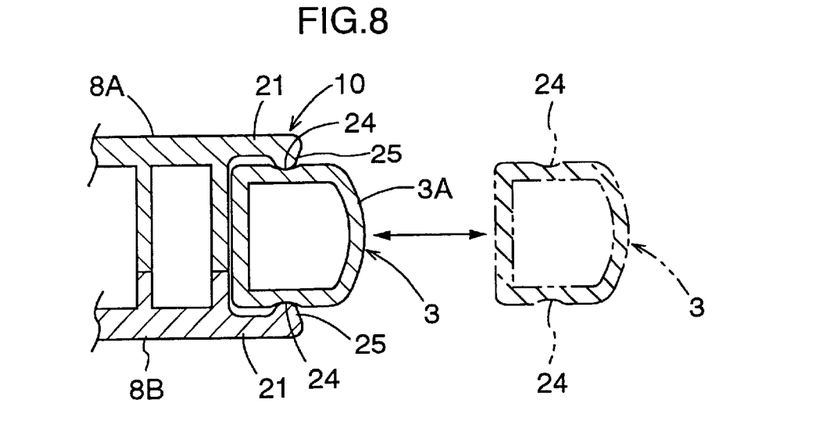
FIG. 8 is a plan view in horizontal section showing a retaining portion of a hand-free apparatus relating to a further embodiment of the present invention.

As shown in FIG. 8, in the pair of opposed lateral faces of the arm member 3A of the apparatus body 3, there may be engaging recesses 24, 24 extending along the longitudinal direction of the arm member 3A. And, the retaining means may include a pair of engaging pieces 25, 25 extending from the lateral face of the cable case 8 for coming into elastic engagement within the engaging recesses 24, 24. In this embodiment shown in FIG. 8, the pair of engaging pieces 25, 25 extend from the upper ends of the pair of fin-like guide plates 21, 21 provided to the cable case 8 to the inner side along the rotational axis X of the cable spool 11 and the pieces 25, 25 extend over the entire vertical longitudinal length of the guide plates 21, 21. The engaging pieces 25, 25 will be press-fitted within the engaging recesses 24, 24 by means of the elastic deformability of the guide plates 21, 21 per se.

When the retaining means for retaining the apparatus body 3 on the cable case 8 is comprised of the engaging recesses 24, 24 and the pair of engaging pieces 25, 25 as in this embodiment, the shoulder portion 20a, the contacted portion 20b and the magnetic attraction means provided inside the retaining portion 10 described in the foregoing embodiment will be eliminated entirely or partially.

Further alternatively, it is also possible to provide the apparatus body with a projection extending along the longitudinal direction of the arm member 3A and also to provide a recess capable of receiving this projection to a pair of inner faces of the guide plates 21, 21 extending from the lateral faces of the cable case 8.

In the foregoing embodiment, the hand-free apparatus 40 relating to the invention has been described as an accessory or attachment for a portable telephone H. Needless to say, this hand-free apparatus 40 may be used also as an accessory or attachment for a personal computer, a transceiver or the like.

The invention may be embodied in any other manner than the disclosed embodiments without departing the spirit thereof. Therefore, the foregoing embodiments should be constructed to illustrate only the presented preferred mode of embodying the invention. Further and other modifications should be apparent for those skilled in the art within the scope of the invention defined in the appended claims.

What is claimed is:

1. A portable hand-free apparatus comprising:

an apparatus body including, a transmitter and a receiver, the apparatus body further including an arm member having a longitudinal direction, with the transmitter being disposed at one end and the receiver at the other end of the longitudinal direction;

an input/output cable connected with the transmitter and the receiver and extending outside from the apparatus body;

a cable case, the cable case incorporating a cable spool rotatable in a first direction about an axis thereof for taking up the cable and rotatable in a second direction contrary to the first direction for feeding the cable out of the cable case, the cable case further incorporating an urging mechanism for urging the cable spool to be rotated in the first direction;

wherein the cable case comprises a front face, a rear face and right and left lateral faces with a smaller width than the front and rear faces, and wherein a retaining portion is provided on one of the right and left lateral faces for detachably retaining the apparatus body, the retaining portion being dimensioned so that the width of the arm member is coexistent within the width of the retaining portion when the apparatus body is retained by the retaining portion; and an attaching device disposed on the rear face of the cable case for detachably securing the cable case to a user.

2. The portable hand-free apparatus according to claim 1, wherein the cable case includes a take-up control mechanism switchable between a locked condition for restricting rotation of the cable spool under force of the urging mechanism and a free condition for allowing the rotation of the cable spool under this force.

3. The portable hand-free apparatus according to claim 2, further comprising an operating member for switching over the take-up control mechanism to the free condition, the operating member being disposed on the other of the right and left lateral faces.

4. The portable hand-free apparatus according to claim 1, wherein the receiver extends from the arm member in a direction transverse to the longitudinal direction; and the retaining portion includes a shoulder portion for supporting the receiver thereon.

5. The portable hand-free apparatus according to claim 4, wherein the cable extends from a predetermined position of the arm member and the cable case defines a through hole for allowing withdrawal of the cable from the cable spool; and a position of the through hole and the predetermined position of the arm member are arranged so as to allow the receiver to be pressed against the shoulder portion under the force of the urging mechanism for taking up the cable on the cable spool when the hand-free apparatus body is retained by the retaining portion.

6. The portable hand-free apparatus according to claim 4, wherein the retaining portion includes a contacted portion formed on the one lateral face of the cable case for coming into contact with the transmitter of the apparatus body retained by the retaining portion; and a position of the through hole and the predetermined position of the arm member are arranged so as to allow the transmitter to be pressed against the contacted portion under the force of the urging mechanism for taking up the cable on the cable spool when the hand-free apparatus body is retained by the retaining portion.

7. The portable hand-free apparatus according to claim 1, wherein the retaining portion includes a pair of guide plates for guiding the apparatus body toward the retaining portion under the force of the urging mechanism for taking up the cable onto the cable spool.

8. The portable hand-free apparatus according to claim 1, wherein the retaining portion includes a magnetic attraction mechanism disposed between the arm member and the cable case.

9. The portable hand-free apparatus according to claim 1, wherein the arm member of the apparatus body includes a pair of engaging recesses defined in its respective opposed lateral faces and extending in the longitudinal direction; and a pair of engaging elements extending from the cable case to be elastically engaged within the respective engaging recesses.

10. The portable hand-free apparatus according to claim 1 wherein the attaching device comprises a clip attachable to a pocket of the user.

11. The portable hand-free apparatus according to claim 1 wherein the cable case further includes an upper face, a hole being defined in the upper face so that a further cable can be extended from outside the hole for connecting the portable hand-free apparatus with a separate cellular phone.

12. A portable hand-free apparatus comprising:

an apparatus body comprising an elongated arm member having first and second ends, the body comprising a transmitter disposed in the first end and a receiver disposed in the second end;

an input/output cable connected with the transmitter and the receiver and extending outside from the apparatus body; and a cable case, the cable case comprising;

spaced apart front and rear faces, the front and rear faces coupled to at least first and second opposing lateral faces, the first and second lateral faces having a width that is smaller than a width of the front and rear faces;

a retaining portion on one of the first and second lateral faces, the retaining portion adapted for detachably retaining the apparatus body and being dimensioned so that the width of the arm member is coexistent within the width of the retaining portion when the apparatus body is retained by the retaining portion;

a cable spool rotatable in a first direction about an axis thereof for taking up the cable and rotatable in a second direction opposite to the first direction for feeding the cable out of the cable case; and an urging mechanism for urging the cable spool to be rotated in the first direction.

13. The portable hand-free apparatus as in claim 12 wherein said arm member is adapted to engage a user's ear to provide for a hands-free communication.

* * * * *

UNITED STATES PATENT AND TRADEMARK OFFICE
CERTIFICATE OF CORRECTION

PATENT NO. : 6,438,248 B1  
DATED : August 20, 2002  
INVENTOR(S) : Tomohiko Kamimura et al.

It is certified that error appears in the above-identified patent and that said Letters Patent is hereby corrected as shown below:

Column 9,  
Lines 19-24, should read
1. A portable hand-free apparatus comprising:
an apparatus body including, a transmitter and a receiver, the apparatus body further including an arm member having a longitudinal direction, with the transmitter being disposed at one end and the receiver at the other end of the longitudinal direction;

Column 10,  
Lines 6-15, should read
6. The portable hand-free apparatus according to claim 5, wherein the retaining portion includes a contacted portion formed on the one lateral face of the cable case for coming into contact with the transmitter of the apparatus body retained by the retaining portion; and a position of the through hole and the predetermined position of the arm member are arranged so as to allow the transmitter to be pressed against the contacted portion under the force of the urging mechanism for taking up the cable on the cable spool when the hand-free apparatus body is retained by the retaining portion.

Signed and Sealed this

Twelfth Day of November, 2002

*Attest:*

*Attesting Officer*

JAMES E. ROGAN  
*Director of the United States Patent and Trademark Office*